United States Patent
Zhang et al.

(10) Patent No.: US 11,877,007 B2
(45) Date of Patent: Jan. 16, 2024

(54) METHODS OF CODING DUPLICATE AND ISOLATED POINTS FOR POINT CLOUD CODING

(71) Applicant: TENCENT AMERICA LLC, Palo Alto, CA (US)

(72) Inventors: Xiang Zhang, Sunnyvale, CA (US); Wen Gao, West Windsor, NJ (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 17/694,079

(22) Filed: Mar. 14, 2022

(65) Prior Publication Data

US 2022/0201331 A1 Jun. 23, 2022

Related U.S. Application Data

(63) Continuation of application No. 17/083,912, filed on Oct. 29, 2020, now Pat. No. 11,310,528.

(60) Provisional application No. 63/002,314, filed on Mar. 30, 2020.

(51) Int. Cl.
| | | |
|---|---|---|
| *H04N 19/597* | (2014.01) | |
| *H04N 19/96* | (2014.01) | |
| *H04N 19/167* | (2014.01) | |
| *H04N 19/103* | (2014.01) | |

(52) U.S. Cl.
CPC ......... *H04N 19/597* (2014.11); *H04N 19/103* (2014.11); *H04N 19/167* (2014.11); *H04N 19/96* (2014.11)

(58) Field of Classification Search
CPC .. H04N 19/597; H04N 19/103; H04N 19/167; H04N 19/96
See application file for complete search history.

(56) References Cited

U.S. PATENT DOCUMENTS

| | | | |
|---|---|---|---|
| 2012/0313944 A1* | 12/2012 | Kontkanen | G06T 15/506 |
| | | | 345/426 |
| 2013/0225050 A1* | 8/2013 | Chan | B24B 9/00 |
| | | | 451/526 |
| 2013/0235050 A1 | 9/2013 | Karras | |
| 2015/0269705 A1* | 9/2015 | Goodman | G06V 20/13 |
| | | | 382/154 |

(Continued)

FOREIGN PATENT DOCUMENTS

| | | | | |
|---|---|---|---|---|
| CN | 112565794 | * | 3/2021 | |
| WO | WO 2021142362 A1 | * | 1/2020 | |
| WO | WO-2021142362 A1 | * | 7/2021 | G06T 15/00 |

OTHER PUBLICATIONS

DAI , Translation of CN 112565794, Dec. 2020 (Year: 2020).*

(Continued)

*Primary Examiner* — Zaihan Jiang
(74) *Attorney, Agent, or Firm* — Sughrue Mion, PLLC

(57) ABSTRACT

A method and apparatus for coding information of a point cloud that includes obtaining the point cloud including a set of points in a three-dimensional space; determining whether a current node in the set of points is isolated; and coding the current node in isolation mode based on a determination that the current node is isolated and coding the current node in non-isolation mode, based on a determination that the current node is not isolated.

15 Claims, 9 Drawing Sheets

(56) References Cited

U.S. PATENT DOCUMENTS

| | | | |
|---|---|---|---|
| 2018/0189982 A1* | 7/2018 | Laroche | G06T 9/40 |
| 2019/0197739 A1* | 6/2019 | Sinharoy | G06T 7/55 |
| 2019/0311546 A1* | 10/2019 | Tay | G05D 1/0088 |
| 2020/0396489 A1* | 12/2020 | Flynn | H04N 19/96 |
| 2020/0413080 A1* | 12/2020 | Lasserre | H04N 19/597 |
| 2021/0004993 A1* | 1/2021 | Sugio | G06T 9/40 |
| 2021/0056730 A1* | 2/2021 | Ricard | H04N 19/184 |
| 2021/0258610 A1* | 8/2021 | Iguchi | G06T 9/001 |

OTHER PUBLICATIONS

International Search Report dated Apr. 27, 2021, issued by the International Searching Authority in application No. PCT/US 21/18103.
Written Opinion dated Apr. 27, 2021, issued by the International Searching Authority in application No. PCT/US 21/18103.
Rufael Mekuria, et al., "Requirements for Point Cloud Compression", ISO/IEC JTC1/SC29/WG11 MPEG2016/n16330, Feb. 2016, 3 pages, Geneva, CH.
Christian Tulvan, et al., "Use Cases for Point Cloud Compression (PCC)", ISO/IEC JTC1/SC29/WG11 MPEG2015/N16331, Jun. 2016, 8 pages, Geneva, CH.
Khaled Mammou, et al., "G-PCC codec description v2", 3DG, ISO/IEC JTC1/SC29/WG11, N18189, Jan. 2019, 39 pages, Marrakech, MA.
"Information technology—MPEG-I (Coded Representation of Immersive Media)—Part 9: Geometry-based Point Cloud Compression", ISO/IEC 23090-9:2019(E), 2019, 104 pages.
Extended European Search Report dated Apr. 26, 2023 in European Application No. 21780723.9.
3DG, "G-PCC codec description v5", International Organisation for Standardisation Organisation Internationale De Normalisation ISO/IEC JTC1/SC29/WG11 Coding of Moving Pictures and Audio, ISO/IEC JTC1/SC29/WG11, N18891, Oct. 2019, Geneva, CH (74 pages total).
Sébastien Lasserre et al., "Improved geometry coding for duplicated points", Blackberry, 2019, No. m48905 (9 pages total).

* cited by examiner

| num_duplicate_points () { | Descriptor |
|---|---|
|    num_duplicated_points_is_one | ae(1) |
|    if ( !num_duplicated_points_is_one ) { | |
|       num_duplicated_points_is_two | ae(1) |
|       if (!num_duplicated_points_is_two) { | |
|          num_duplicated_points_minus_three | ue(v) |
|       } | |
|    } | |
| } | |

FIG. 4

| num_duplicate_points () { | Descriptor |
|---|---|
|    num_duplicated_points_is_one | ae(1) |
|    if ( !num_duplicated_points_is_one ) { | |
|      num_duplicated_points_minus_two | ue(v) |
|    } | |
| } | |

FIG. 5

| geometry_node( depth, nodeIdx, xN, yN, zN ) { | Descriptor |
|---|---|
|   if (geomIsolatedModeFlag && depth <= geomIsolatedModeMaxDepth)<br>  { // check eligibility of isolated mode | |
|     geom_isolated_flag | ae(1) |
|     if ( geom_isolated_flag ) { | |
|       if ( !geomRemoveDuplicateFlag ) { | |
|         num_duplicate_points | ae(v) |
|       } | |
|       isolated_position_x | u(n) |
|       isolated_position_y | u(n) |
|       isolated_position_z | u(n) |
|     } | |
|   occupancy_map | ae(v) |
|   if ( depth == MaxGeometryOctreeDepth-1 ) { | |
|     if (!geomRemoveDuplicateFlag ) { | |
|       for ( child = 0; child < GeometryNodeChildrenCnt; child++) { | |
|         num_duplicate_points | ae(v) |
|       } | |
|     } | |
|   } | |
| } | |

FIG. 6

METHODS OF CODING DUPLICATE AND ISOLATED POINTS FOR POINT CLOUD CODING

CROSS-REFERENCE TO RELATED APPLICATION(S)

This application is a Continuation of U.S. application Ser. No. 17/083,912, filed Oct. 29, 2020, which is based on and claims priority under 35 U.S.C. § 119 to U.S. Provisional Patent Application No. 63/002,314, filed Mar. 30, 2020, in the United States Patent and Trademark Office, the disclosure of which is incorporated by reference herein in its entirety.

BACKGROUND

Point cloud modeling has been widely used in recent years. For example, it is used in autonomous driving vehicles for object detection and localization, in geographic information systems (GIS) for mapping, and in cultural heritage projects to visualize and archive cultural heritage objects and collections, etc.

Point clouds contain a set of high dimensional points, typically of three dimensional (3D), each including 3D positional information and additional attributes such as color, reflectance, etc. The high dimensional points can be captured using multiple cameras and.or depth sensors, via Light Detection and Ranging (LIDAR) in various setups, and may be made up of thousands to billions of points, thereby allowing realistically representations of original scenes.

Compression technologies are needed to reduce the amount of data required to represent a point cloud for faster transmission and/or storage reduction. As explained in Non-Patent Literatures [1]-[4], the Moving Picture Experts Group (MPEG), a working group of the International Organization for Standardization (ISO) and the International Electrotechnical Commission (IEC), has created a joint technical committee (JTC 1/SC 29/WG 11) and an ad-hoc group (MPEG-PCC) to standardize compression techniques for static and/or dynamic point clouds.

Non-Patent Literature [1]: Use Cases for Point Cloud Compression, ISO/IEC JTC1/SC29 WG11 Doc. N16331, Geneva, CH, June 2016.
Non-Patent Literature [2]: Requirements for Point Cloud Compression, ISO/IEC JTC1/SC29 WG11 Doc. N16330, Geneva, CH, June 2016.
Non-Patent Literature [3]: G-PCC Codec description, ISO/IEC JTC1/SC29/WG11, Doc. M18673, July 2019.
Non-Patent Literature [4]: Text of ISO/IEC CD 23090-9 Geometry-based Point Cloud Compression, ISO/IEC JTC1/SC29 WG11 Doc. N18478, Geneva, July 2019.

SUMMARY

The disclosure is directed to Point Cloud Coding (PCC), and more particularly, to methods, apparatuses and systems for coding duplicate and isolated points for the purpose of providing an improved point cloud compression.

According to an aspect of the disclosure, there is provided a method for coding information of a point cloud, the method performed by at least one processor and comprising: obtaining the point cloud including a set of points in a three-dimensional space; determining whether a current node in the set of points is isolated; and coding the current node in isolation mode based on a determination that the current node is isolated and coding the current node in non-isolation mode, based on a determination that the current node is not isolated.

The method may further comprise, in the isolation mode, determining whether the current node is a duplicate node.

The method may further comprise coding a duplicate number and coding a geometry position of the current node based on a determination that the current node is a duplicate node.

The coding the geometry position of the current node may be performed after the duplicate number is coded.

The method may further comprise coding a geometry position of the isolated current node without coding a duplicate number based on a determination that the current node is not a duplicate node.

The method may further comprise, in the non-isolation mode, determining whether the current node is a leaf node.

The method may further comprise coding a duplicate number and terminating tree partition based on a determination that the current node is a leaf node.

The method may further comprise coding occupancy information and inserting all occupied child nodes in a first-in-first-out list based on a determination that the current node is not a leaf node.

According to another aspect of the disclosure, there is provided an apparatus for coding information of a point cloud, the apparatus comprising: a memory storing one or more instructions; and a processor configured to execute the one or more instructions to: obtain the point cloud including a set of points in a three-dimensional space; determine whether a current node in the set of points is isolated; and code the current node in isolation mode based on a determination that the current node is isolated and code the current node in non-isolation mode, based on a determination that the current node is not isolated.

According to another aspect of the disclosure, there is provided a non-transitory computer readable medium having stored thereon a method for coding information of a point cloud, the method performed by at least one processor and comprising: obtaining the point cloud including a set of points in a three-dimensional space; determining whether a current node in the set of points is isolated; and coding the current node in isolation mode based on a determination that the current node is isolated and coding the current node in non-isolation mode, based on a determination that the current node is not isolated.

BRIEF DESCRIPTION OF THE DRAWINGS

FIGS. 4-6 are examples of methods for coding information of a point cloud.

DETAILED DESCRIPTION

Point-Cloud Compression in Test Model 13 (TMC13) in MPEG

As described in Non-Patent Literature [3] and Non-Patent Literature [4], in the Test Model 13 (TMC13) codec, promulgated by the MPEG, geometry information and associated attributes, such as color or reflectance, of points of a point cloud, are separately compressed. The geometry information, e.g., 3D coordinates of the points, is coded by octree-partitioning with occupancy information. The attributes are then compressed based on reconstructed geometry using prediction, lifting and region adaptive hierarchical transform techniques. The octree-partitioning and occupancy encoding processes is described in more detail below.

Octree Partitioning

In TMC13, if an octree geometry codec is used, the geometry encoding proceeds as follows: First, a cubical axis-aligned bounding box B is defined by two points (0,0,0) and $(2^{M-1}, 2^{M-1}, 2^{M-1})$ where $2^{M-1}$ defines the size of B and M is specified in the bitstream.

Figure 1:
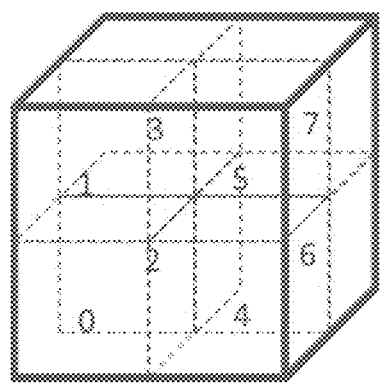
FIG. 1 is an illustration of an octree partition in three-dimensional space according to an example embodiment.

An octree structure is then built by recursively subdividing B. At each stage, a cube is subdivided into 8 sub-cubes. An 8-bit code, namely the occupancy code, is then generated by associating a 1-bit value with each sub-cube in order to indicate whether it contains points (i.e., whether it is full and has value of 1) or not (i.e., whether it is empty and has a value of 0). Only full sub-cubes with a size greater than 1 (i.e., non-voxels) are further subdivided. FIG. 1 presents an illustration of an octree-partition in 3D space.

Figure 2:
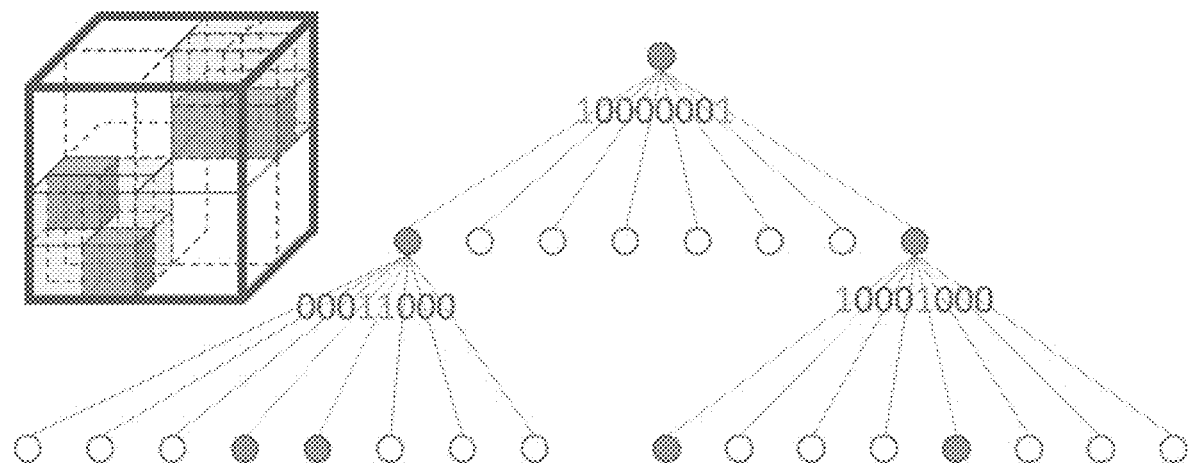
FIG. 2 is an illustration of an octree-partition and tree structure according to an example embodiment.

An example of two-level octree partition and the corresponding occupancy code are shown in FIG. 2, where cubes and nodes in dark indicate they are occupied by points.

Encoding of Occupancy Code

The occupancy code of each node is then compressed by an arithmetic encoder. The occupancy code can be denoted as S, which is an 8-bit integer, and each bit in S indicates the occupancy status of each child node. Two encoding methods for occupancy code exist in TMC13: bit-wise encoding and byte-wise encoding. Bit-wise encoding is enabled by default. Both methods perform arithmetic coding with context modeling to encode the occupancy code, and the context status is initialized at the beginning of the coding process and is updated during the coding process.

For bit-wise encoding, eight bins in S are encoded in a certain order where each bin is encoded by referring to the occupancy status of neighboring nodes and child nodes of neighboring nodes, where the neighboring nodes are in the same level of a current node.

For byte-wise encoding, S is encoded by referring to:
an adaptive look up table (A-LUT), which keeps track of the N (e.g., 32) most frequent occupancy codes, and
a cache which keeps track of the last different observed M (e.g., 16) occupancy codes.

A binary flag indicating whether S is the A-LUT or not is encoded. If S is in the A-LUT, the index in the A-LUT is encoded by using a binary arithmetic encoder. If S is not in the A-LUT, then a binary flag indicating whether S is in the cache or not is encoded. If S is in the cache, then the binary representation of its index is encoded by using a binary arithmetic encoder. Otherwise, if S is not in the cache, then the binary representation of S is encoded by using a binary arithmetic encoder.

The decoding process starts by parsing dimensions of the bounding box B from the bitstream. The same octree structure is then built by subdividing B according to the decoded occupancy codes.

In the codec scheme discussed above, duplicate points may refer to points in the octree structure with the same geometry position, but their attributes could be different. According to an example embodiment, the attributes may be color, reflectance or other characteristic features associated with the same geometry position. However, the disclosure is not limited to different attributes. As such, according to another example embodiment, the duplicate points may refer to points in the octree structure with the same geometry position, and have a same attribute. In some cases, the encoder may need to keep the point number unchanged after compression even when geometry quantization is performed. This may lead to a situation where many points are quantized to a same position, yielding many duplicate points.

On the other hand, isolated points are points that are single points with identical geometry position in an octree node. For example, if a point cloud contains only one point, then this point is an isolated point of the root octree node. For example, if a particular node has only one occupied child node, the particular node will is an isolated node.

According to an example embodiment, the isolated point(s) may have one or multiple points as long as they have the same and unique geometry position in an octree node. In other words, isolated points may have duplicates.

According to one or more aspects of the disclosure, coding duplicate and isolated points improve the overall coding performance. For instance, the method of coding the duplicate and/or the isolated points reduces the number of bits used for coding, thus resulting in improved bitrate. Moreover, the memory used for encoding and decoding may be decreased and speed of the encoding and decoding may be increased due to the coding of the duplicate and isolated points. In this disclosure, methods of coding duplicate and isolated points are elaborated.

According to the disclosure, the proposed methods, apparatuses and systems may be used separately or combined in any order. Further, each of the methods (or embodiments), encoder, and decoder may be implemented by processing circuitry (e.g., one or more processors or one or more integrated circuits). In one example, the one or more processors execute a program that is stored in a non-transitory computer-readable medium. Further, the disclosures herein are not limited to uses related to TMC13 software or the MPEG-PCC standard.

Framework of Coding Isolated and Duplicate Points

Figure 3:
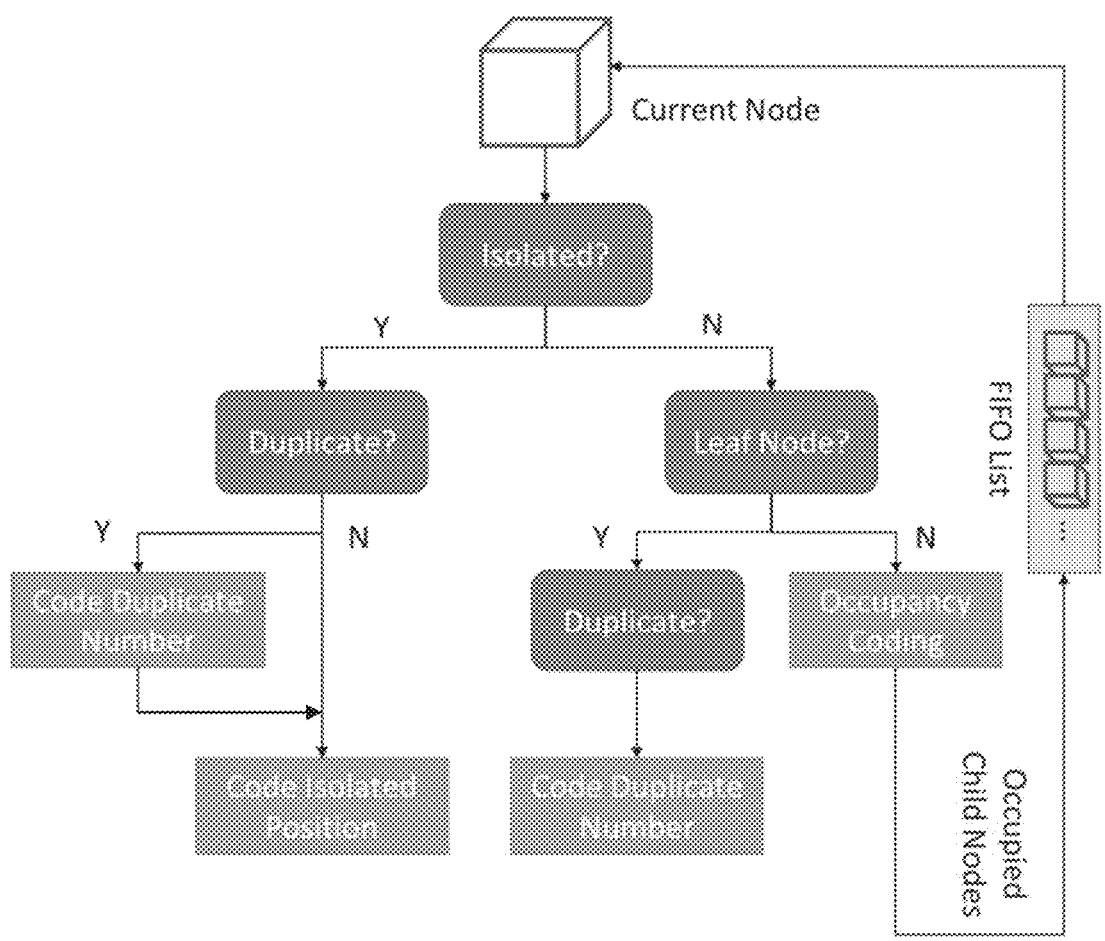
FIG. 3 is an illustration of a framework of coding isolated and duplicate points according to an example embodiment.

FIG. 3 illustrates an example embodiment of an overall coding method. The octree node may be coded in a predefined order, in this case, the breadth-first coding order is used, where a first-in-first-out (FIFO) data structure (or FIFO list) is applied. For each octree node, various criteria are applied to determine whether the current node is isolated. If it is isolated, current node is coded in isolation mode, where the duplicate number and geometry position of the isolated points are coded. Otherwise, current node is coded as follows: If current node is a leaf node, the duplicate number may be coded for the node and the tree partition is terminated. On the other hand, if current node is not a leaf node, the occupancy code is then coded, and all the occupied child nodes are inserted to the FIFO.

Coding of Duplicate Mode

As shown in FIG. 3, duplicate mode can be applied for leaf nodes or isolated point. According to an example embodiment, in duplicate mode, it may be necessary to signal the number of duplicate points. Since the minimal number of duplicate points is one, the number is reduced by one before coding. To code the number, one may code the leading bits with context and entropy coding.

According to an example embodiment, the syntax table of num_duplicate_points may be as shown in FIG. 4. In FIG. 4, the "num_duplicated_points_is_one" specifies if num_duplicate_points equals to 1, the "num_duplicated_points_is_two" specifies if num_duplicate_points equals to 2 and "num_duplicated_points_minus_three" specifies num_duplicate_points as follows:

$$num\_duplicate\_points = num\_duplicated\_points\_minus\_three + 3.$$

For example, the coding operation may determine the number of duplicate points for the current node. Here, the coding operation may determine whether the number of duplicate points is one. If the number of duplicate points is one, the "num_duplicated_points_is_one" may be specified. According to an example embodiment, the method may include specifying that the "num_duplicated_points_is_one" by indicating or setting a flag.

If the number of duplicate points is not one, the coding operation may determine whether the number of duplicate points is two. If number of duplicate points is two, the code may specify that "num_duplicated_points_is_two". However, if the number of duplicate points is not two, the coding operation may specify that the num_duplicate_points=num_duplicated_points_minus_three+3.

According to an example embodiment, by implementing the process illustrated in FIG. 4, an optimal coding efficiency may be achieved.

According to an example embodiment, a decoding process may be implemented in reverse using the number of duplicate points specified as shown in FIG. 4.

According to another example embodiment, the syntax table of num_duplicate_points may be shown in FIG. 5. In FIG. 5, "num_duplicated_points_is_one" specifies if num_duplicate_points equals to 1 and "num_duplicated_points_minus_two" specifies num_duplicate_points as follows:

$$num\_duplicate\_points = num\_duplicated\_points\_minus\_two + 2.$$

Coding of Isolated Mode

According to an aspect of the disclosure, various criteria can be used to determine whether the isolated mode is eligible. According to an example embodiment, the isolated mode is eligible only if the current partition depth is smaller than a threshold. According to an example embodiment, the threshold can be fixed or can be specified by a high-level syntax, such as sequence parameter set, geometry parameter set or slice header, etc. In another example embodiment, beside checking the partition depth, the method may include checking if current node has no sibling in octree structure. If the current node has at least one sibling, the isolated mode is not eligible.

According to an example embodiment, if the isolated mode is eligible, a flag is signaled to indicate whether the current node has isolated points. This flag can be coded with or without entropy coding, and different contexts can be used to improve the coding efficiency. In one embodiment, the flag is coded by entropy coding with one context. Next, if the isolated flag is true, duplicate mode may be applied if duplicate points are allowed. Finally, the isolated position is signaled and this position can be coded with or without entropy coding, and multiple contexts can be applied. According to an example embodiment, the isolated position is bypass coded without entropy coding.

According to an example embodiment, the syntax table involving isolated mode may be as shown in FIG. 6.

For instance, the coding operation may first determine whether the isolated mode is eligible. According to an example embodiment, the isolated mode is eligible only if the current partition depth is smaller than a threshold (i.e., "if (geomIsolatedModeFlag && depth<=geomIsolatedModeMaxDepth)"). However, the disclosure is not limited thereto, and as such, according to another example embodiment, the check for eligibility of the isolated mode based on the current partition depth may be omitted. According to another example embodiment, the check for eligibility of the isolated mode may be based on a different criterion.

Next, the coding operation may determine if the current node is an isolated node (i.e., "geom_isolated_flag" is set). Based on a determination that the current node is an isolated node, the geometric position of the current node is coded (i.e., isolated_position_x, isolated_position_y, isolated_position_z).

According to an example embodiment, the coding operation may further include determining if the current node is a duplicate node (i.e, "!geomRemoveDuplicateFlag"). In this case, the number of duplicate points is also coded. According to an example embodiment, the number of duplicate points may be coded using the method illustrated in FIG. 4 or 5. However, the disclosure is not limited thereto, and as such, other methods of coding the node may be implemented.

In FIG. 6, the geomIsolatedModeFlag and the geomIsolatedModeMaxDepth are specified in high-level syntax to determine the eligibility of isolated mode. depth indicates the partition depth of current octree node. In this case, the isolated mode is eligible only when geomIsolatedModeFlag is true and depth is smaller than or equal to geomIsolatedModeMaxDepth. The geom_isolated_flag specifies if current node is coded in isolated mode. The geomRemoveDuplicateFlag is specified in high-level syntax to indicate the eligibility of duplicate mode. The num_duplicate_points specifies the number of duplicate points in current node as described above. The isolated_position_x, isolated_position_y and isolated_position_z specify the isolated position.

According to an example embodiment, a decoding process may be implemented in reverse using the number of duplicate points specified as shown in FIG. 6.

According to an example embodiment, the method of illustrated in FIG. 6, for coding the duplicate and/or the isolated points reduces the number of bits used for coding, thus resulting in improved bitrate. Moreover, the memory used for encoding and decoding may be decreased and speed of the encoding and decoding may be increased due to the coding of the duplicate and isolated points.

Figure 7:
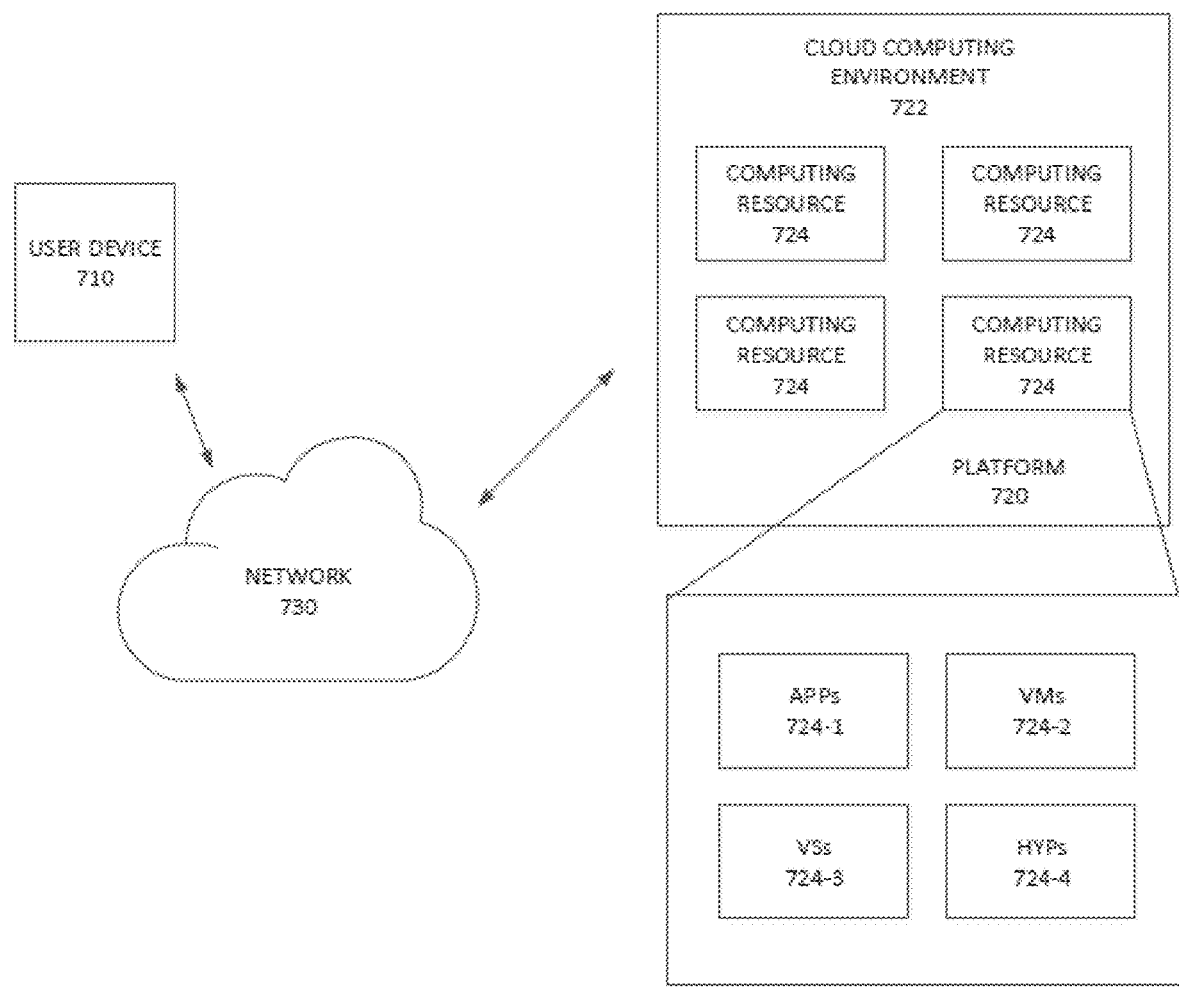
FIG. 7 is a diagram of an example environment in which systems and/or methods, described herein, may be implemented.

FIG. 7 is a diagram of an example communication system 700 in which systems and/or methods, described herein, may be implemented. As shown in FIG. 7, communication system 700 may include a user device 710, a platform 720, and a network 730. Devices of communication system 700 may interconnect via wired connections, wireless connections, or a combination of wired and wireless connections.

The communication system 700 may support unidirectional transmission of data. For example, a first user device 710 may code video data at a local location for transmission to a second user device 710 via the network 730. The second user device 710 may receive the coded video data of the first user device 710 from the network 730, decode the coded data and display the recovered video data. Unidirectional data transmission may be common in media serving applications, and the like.

The communication system 700 may support bidirectional transmission of data. For example, the communication system 700 may support bidirectional transmission of coded video that may occur, for example, during videoconferencing. For bidirectional transmission of data, each user device 710 may code video data captured at a local location for transmission to the other user device 710 via the network 730. Each user device 710 also may receive the coded video data transmitted by the other user device 710, may decode the coded data and may display the recovered video data at a local display device.

User device 710 includes one or more devices capable of receiving, generating, storing, processing, and/or providing information associated with platform 720. For example, user device 710 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, user device 710 may receive information from and/or transmit information to platform 720.

Platform 720 includes one or more devices capable of providing information to user device 710, as described elsewhere herein. In some implementations, platform 720 may include a cloud server or a group of cloud servers. In some implementations, platform 720 may be designed to be modular such that certain software components may be swapped in or out depending on a particular need. As such, platform 720 may be easily and/or quickly reconfigured for different uses.

In some implementations, as shown, platform 720 may be hosted in cloud computing environment 722. Notably, while implementations described herein describe platform 720 as being hosted in cloud computing environment 722, in some implementations, platform 720 is not be cloud-based (i.e., may be implemented outside of a cloud computing environment) or may be partially cloud-based.

Cloud computing environment 722 includes an environment that hosts platform 720. Cloud computing environment 722 may provide computation, software, data access, storage, etc. services that do not require end-user (e.g., user device 710) knowledge of a physical location and configuration of system(s) and/or device(s) that hosts platform 720. As shown, cloud computing environment 722 may include a group of computing resources 724 (referred to collectively as "computing resources 724" and individually as "computing resource 724").

Computing resource 724 includes one or more personal computers, workstation computers, server devices, or other types of computation and/or communication devices. In some implementations, computing resource 724 may host platform 720. The cloud resources may include compute instances executing in computing resource 724, storage devices provided in computing resource 724, data transfer devices provided by computing resource 724, etc. In some implementations, computing resource 724 may communicate with other computing resources 724 via wired connections, wireless connections, or a combination of wired and wireless connections.

As further shown in FIG. 7, computing resource 724 includes a group of cloud resources, such as one or more applications ("APPs") 724-1, one or more virtual machines ("VMs") 724-2, virtualized storage ("VSs") 724-3, one or more hypervisors ("HYPs") 724-4, or the like.

Application 724-1 includes one or more software applications that may be provided to or accessed by user device 710. Application 724-1 may eliminate a need to install and execute the software applications on user device 710. For example, application 724-1 may include software associated with platform 720 and/or any other software capable of being provided via cloud computing environment 722. In some implementations, one application 724-1 may send/receive information to/from one or more other applications 724-1, via virtual machine 724-2.

Virtual machine 724-2 includes a software implementation of a machine (e.g., a computer) that executes programs like a physical machine. Virtual machine 724-2 may be either a system virtual machine or a process virtual machine, depending upon use and degree of correspondence to any real machine by virtual machine 724-2. A system virtual machine may provide a complete system platform that supports execution of a complete operating system ("OS"). A process virtual machine may execute a single program, and may support a single process. In some implementations, virtual machine 724-2 may execute on behalf of a user (e.g., user device 710), and may manage infrastructure of cloud computing environment 722, such as data management, synchronization, or long-duration data transfers.

Virtualized storage 724-3 includes one or more storage systems and/or one or more devices that use virtualization techniques within the storage systems or devices of computing resource 724. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 724-4 may provide hardware virtualization techniques that allow multiple operating systems (e.g., "guest operating systems") to execute concurrently on a host computer, such as computing resource 724. Hypervisor 724-4 may present a virtual operating platform to the guest operating systems, and may manage the execution of the guest operating systems. Multiple instances of a variety of operating systems may share virtualized hardware resources.

Network 730 includes one or more wired and/or wireless networks. For example, network 730 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 7 are provided as an example. In practice, there may be additional devices and/or networks, fewer devices and/or networks, different devices and/or networks, or differently arranged devices and/or networks than those shown in FIG. 7. Furthermore, two or more devices shown in FIG. 7 may be implemented within a single device, or a single device shown in FIG. 7 may be implemented as multiple, distributed devices. Additionally, or alternatively, a set of devices (e.g., one or more devices) of environment 700 may perform one or more functions described as being performed by another set of devices of environment 700.

Figure 8:
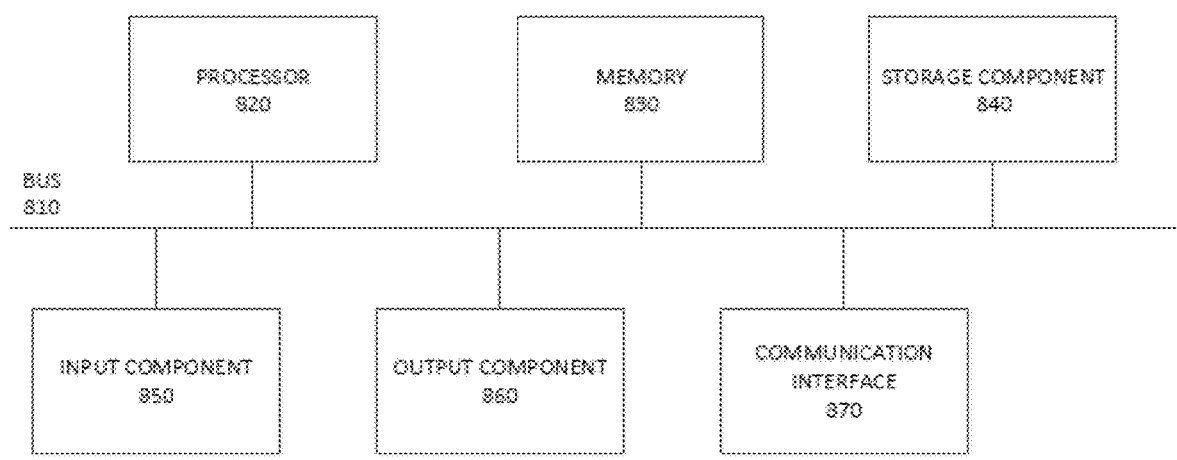
FIG. 8 is a diagram of example components of one or more devices of FIG. 7.

FIG. 8 is a diagram of example components of a device 800. Device 800 may correspond to user device 710 and/or platform 720. As shown in FIG. 8, device 800 may include a bus 810, a processor 820, a memory 830, a storage component 840, an input component 850, an output component 860, and a communication interface 870.

Bus 810 includes a component that permits communication among the components of device 800. Processor 820 is implemented in hardware, firmware, or a combination of hardware and software. Processor 820 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 820 includes one or more processors capable of being programmed to perform a function. Memory 830 includes a random access memory (RAM), a read only memory (ROM), and/or another type of dynamic or static storage device (e.g., a flash memory, a magnetic memory, and/or an optical memory) that stores information and/or instructions for use by processor 820.

Storage component 840 stores information and/or software related to the operation and use of device 800. For example, storage component 840 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 850 includes a component that permits device 800 to receive information, such as via user input (e.g., a touch screen display, a keyboard, a keypad, a mouse, a button, a switch, and/or a microphone). Additionally, or alternatively, input component 850 may include a sensor for sensing information (e.g., a global positioning system (GPS) component, an accelerometer, a gyroscope, and/or an actuator). Output component 860 includes a component that provides output information from device 800 (e.g., a display, a speaker, and/or one or more light-emitting diodes (LEDs)).

Communication interface 870 includes a transceiver-like component (e.g., a transceiver and/or a separate receiver and transmitter) that enables device 800 to communicate with other devices, such as via a wired connection, a wireless connection, or a combination of wired and wireless connections. Communication interface 870 may permit device 800 to receive information from another device and/or provide information to another device. For example, communication interface 870 may include an Ethernet interface, an optical interface, a coaxial interface, an infrared interface, a radio frequency (RF) interface, a universal serial bus (USB) interface, a Wi-Fi interface, a cellular network interface, or the like.

According to an example embodiment, the device 800 may perform one or more processes described herein. Device 800 may perform these processes in response to processor 820 executing software instructions stored by a non-transitory computer-readable medium, such as memory 830 and/or storage component 840. A computer-readable medium is defined herein as a non-transitory memory device. A memory device includes memory space within a single physical storage device or memory space spread across multiple physical storage devices.

Software instructions may be read into memory 830 and/or storage component 840 from another computer-readable medium or from another device via communication interface 870. When executed, software instructions stored in memory 830 and/or storage component 840 may cause processor 820 to perform one or more processes described herein.

Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 8 are provided as an example. In practice, device 800 may include additional components, fewer components, different components, or differently arranged components than those shown in FIG. 8. Additionally, or alternatively, a set of components (e.g., one or more components) of device 800 may perform one or more functions described as being performed by another set of components of device 800.

Figure 9:
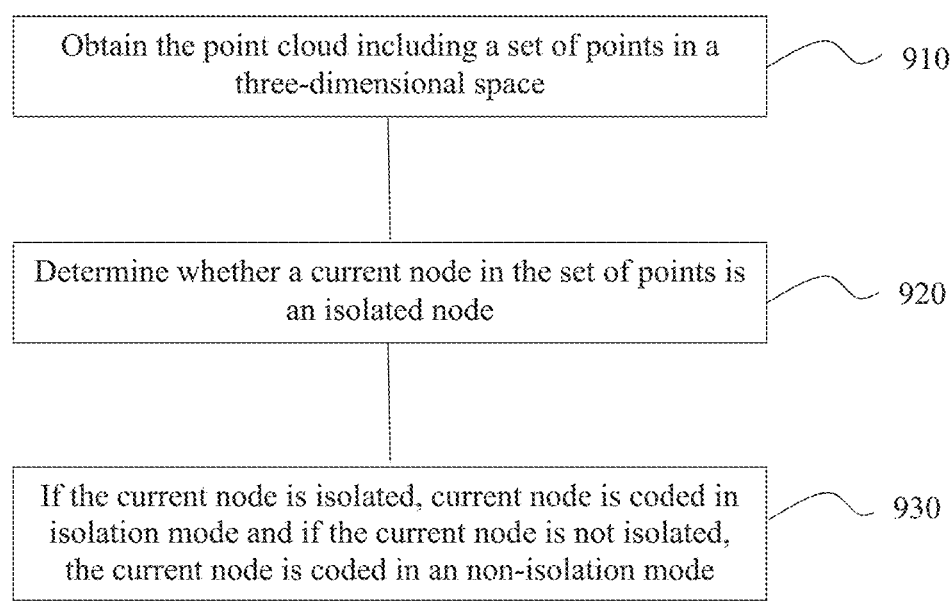
FIG. 9 is a flowchart of the method of coding isolated and duplicate points according to an example embodiment.

FIG. 9 is a flow chart of an example process 900 for coding isolated and duplicate points of a point cloud. In some implementations, one or more process blocks of FIG. 9 may be performed by user device 710. In some implementations, one or more process blocks of FIG. 9 may be performed by another device or a group of devices separate from or including user device 710, such as platform 720.

As shown in FIG. 9, in operation 910, the point cloud including a set of points in a three-dimensional space may be obtained. In operation 920, determine whether a current node in the set of points is an isolated node (i.e., the node is isolated). In operation 930, if the current node is isolated, current node is coded in isolation mode and if the current node is not isolated, the current node is coded in an non-isolation mode.

In the isolation mode, it is determined whether the current node is a duplicate node. If the current node is a duplicate node, the duplicate number is coded, and thereafter, the geometry position of the isolated current node is coded. If the current node is not a duplicate node, the geometry position of the isolated current node is coded without performing an operation to duplicate number coding.

In the non-isolation mode, the current node is coded as follows: If current node is a leaf node, the duplicate number may be coded for the node and the tree partition is terminated. On the other hand, if current node is not a leaf node, the occupancy code is then coded, and all the occupied child nodes are inserted to the FIFO list.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method for coding information of a point cloud, the method performed by at least one processor and comprising:
    obtaining the point cloud including a set of points in a three-dimensional space;
    determining whether a current node in the set of points is eligible to be coded in an isolated mode, wherein determining that the current node is eligible comprises:
        determining that a current partition depth of the current node is smaller than a threshold, wherein the threshold is specified by a high-level syntax, and
        determining that the current node has no siblings in an associated octree structure,
    based on a determination that the current node is eligible to be coded in the isolated mode, coding the current node in isolation mode by:
        setting a geometry isolation flag that indicates the current node has one or more isolated points coded in the isolated mode,
        based on the geometry isolation flag indicating that the current node has the one or more isolated points coded in the isolated mode, determining whether the current node is eligible for a duplicate mode,
        based on the current node being eligible for the duplicate mode, determining a number of duplicate points in the current node, and
        determining an isolated position of the current node in the three-dimensional space, and
    based on a determination that the current node is not isolated, coding the current node in a non-isolation mode.

2. The method of claim 1, further comprising, based on a determination that the current node is a duplicate node, determining a duplicate number as the number of duplicate points.

3. The method of claim 2, wherein the isolated position of the current node is determined after the duplicate number is determined.

4. The method of claim 1, further comprising, in the non-isolation mode, coding the current node in the non-isolation mode, in which:
    a duplicate number is determined for the current node based on a determination that the current node is a leaf node, or
    occupancy information is determined based on a determination that the current node is not the leaf node.

5. The method of claim 4, further comprising, in the non-isolation mode, determining whether the current node is the leaf node and terminating tree partition based on a determination that the current node is the leaf node.

6. The method of claim 5, further comprising, based on a determination that the current node is not the leaf node, coding the current node to include occupancy information and inserting all occupied child nodes in a first-in-first-out list.

7. An apparatus for coding information of a point cloud, the apparatus comprising:
    at least one memory storing computer program code; and
    at least one processor configured to access the computer program code and operate as instructed by the computer program code, the computer program code including:
    obtaining code configured to cause the at least one processor to obtain the point cloud including a set of points in a three-dimensional space;
    isolation determining code configured to cause the at least one processor to determine whether a current node in the set of points is eligible to be coded in an isolated mode, wherein the isolation determining code comprises:
        threshold determining code configured to cause the at least one processor to determine that a current partition depth of the current node is smaller than a threshold, wherein the threshold is specified by a high-level syntax, and
        sibling determining code configured to cause the at least one processor to determine that the current node has no siblings in an associated octree structure,
    encoding code configured to cause the at least one processor to, based on a determination that the current node is eligible to be coded in the isolated mode, code the current node in isolation mode by:
        setting a geometry isolation flag that indicates the current node has one or more isolated points coded in the isolated mode,
        based on the geometry isolation flag indicating that the current node has the one or more isolated points coded in the isolated mode, determining whether the current node is eligible for a duplicate mode, based on the current node being eligible for the duplicate mode, determining a number of duplicate points in the current node, and determining a position of the current node in the three-dimensional space; and based on a determination that the current node is not isolated, coding the current node in a non-isolation mode.

8. The apparatus of claim 7, wherein the encoding code is further configured to cause the at least one processor to, based on a determination that the current node is a duplicate node, determine a duplicate number as the number of duplicate points.

9. The apparatus of claim 7, wherein, in the non-isolation mode, the encoding code is further configured to cause the at least one processor to code the current node in the non-isolation mode, in which:

a duplicate number is determined for the current node based on a determination that the current node is a leaf node, or occupancy information is determined based on a determination that the current node is not the leaf node.

10. The apparatus of claim 9, wherein, in the non-isolation mode, the encoding code is further configured to cause the at least one processor to determine whether the current node is the leaf node and terminate tree partition based on a determination that the current node is the leaf node.

11. The apparatus of claim 10, wherein the encoding code is further configured to cause the at least one processor to code a duplicate number and terminating tree partition based on a determination that the current node is the leaf node.

12. The apparatus of claim 10, wherein, based on a determination that the current node is not the leaf node, the encoding code is further configured to cause the at least one processor to code the current node to include occupancy information and inserting all occupied child nodes in a first-in-first-out list.

13. A non-transitory computer readable medium having stored thereon computer code that when executed by at least one processor can cause the processor to code information of a point cloud by:

obtaining the point cloud including a set of points in a three-dimensional space;

determining whether a current node in the set of points is eligible to be coded in an isolated mode, wherein determining that the current node is eligible comprises:

determining that a current partition depth of the current node is smaller than a threshold, wherein the threshold is specified by a high-level syntax, and determining that the current node has no siblings in an associated octree structure, based on a determination that the current node is eligible to be coded in the isolated mode, coding the current node in isolation mode by:

setting a geometry isolation flag that indicates the current node has one or more isolated points coded in the isolated mode, based on the geometry isolation flag indicating that the current node has the one or more isolated points coded in the isolated mode, determining whether the current node is eligible for a duplicate mode, based on the current node being eligible for the duplicate mode, determining a number of duplicate points in the current node, and determining an isolated position of the current node in the three-dimensional space, and based on a determination that the current node is not isolated, coding the current node in a non-isolation mode.

14. The non-transitory computer readable medium of claim 13, further comprising:

determining a duplicate number as the number of duplicate points based on a determination that the current node is a duplicate node.

15. The non-transitory computer readable medium of claim 13, wherein the isolated position of the current node is determined after the duplicate number is determined.

* * * * *